Aug. 7, 1923.
A. G. REESE
1,464,294
COUNTERBALANCED HOISTING MECHANISM
Filed May 15, 1919
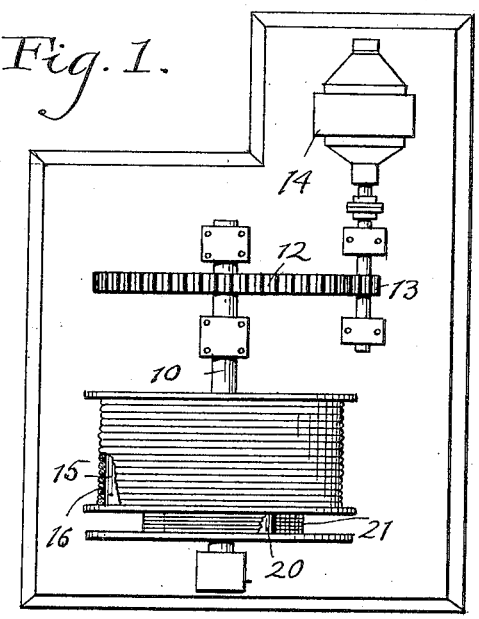
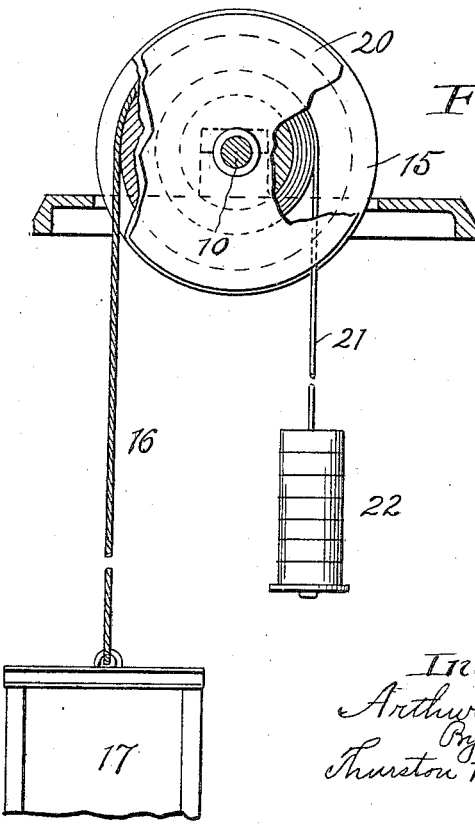
Inventor:
Arthur G. Reese
By
Thurston Kwis & Hudson
attys.

Patented Aug. 7, 1923.

1,464,294

UNITED STATES PATENT OFFICE.

ARTHUR G. REESE, OF CLEVELAND, OHIO, ASSIGNOR TO THE WELLMAN-SEAVER-MORGAN COMPANY, OF CLEVELAND, OHIO, A CORPORATION OF OHIO.

COUNTERBALANCED HOISTING MECHANISM.

Application filed May 15, 1919. Serial No. 297,273.

*To all whom it may concern:*

Be it known that I, ARTHUR G. REESE, a citizen of the United States, residing at Cleveland, in the county of Cuyahoga and State of Ohio, have invented a certain new and useful Improvement in Counterbalanced Hoisting Mechanism, of which the following is a full, clear, and exact description.

This invention is especially useful in connection with mechanism adapted, among other uses, for hoisting men out of and lowering them into mines.

The object of the invention is to enable the load supporting cage to be lifted or lowered at substantially uniform predetermined rate, and by the employment of a minimum of power which may be derived from a small motor.

Of course the hoisting mechanism in which the invention is embodied, as shown in the drawing, may be used economically for lifting and lowering material of various sorts; but as stated, its chief advantage is in lifting and lowering men, because in many States the statutes limit the speed at which men may be so lifted and lowered. Therefore, in order that they may be lifted and lowered in the minimum time, it is desirable that their rate of movement be substantially uniform and at approximately the maximum permissible rate,—a result which the said invention is admirably adapted to produce.

The invention consists in the construction and combination of parts shown in the drawings and hereinafter described and pointed out definitely in the appended claims.

In the drawing, Fig. 1 is a plan view of hoisting mechanism which embodies the present invention, and Fig. 2 is an end view thereof with some of the parts broken away as appears.

Referring to the parts by reference characters, 10 represents the shaft to which is keyed or otherwise fastened a hoisting drum 15, and a reel 20, which as shown are substantially continuous. A large gear 12 is fixed to this shaft, and this meshes with the pinion 13 which is driven by a motor 14. A round rope 16 is connected with the drum; and is wound helically thereon. The load supporting cage 17 or other device is connected with the end of this round rope. A flat rope 21 is connected to the reel and is wound spirally thereon but in the opposite direction to that in which the round rope is wound upon the drum; and a counterbalancing weight 22 is secured to the end of this flat rope.

It is evident that, through the described mechanism the drum and the reel will be rotated in unison. When rotated in one direction the round rope will be wound helically upon the drum, and at the same time the spirally wound flat rope upon the reel will be unwound, and vice versa.

When the cage is near the bottom of a mine shaft, the weight suspended from the drum is equal to the weight of the cage, plus its load, and plus the weight of the unwound round rope. At that time the flat rope is substantially all wound upon the reel, wherefore the counterbalancing effect comes from the weight alone. The moment of the counterweighting instrumentality is, at this time, the weight of the counterweight 22 multiplied by the radial distance from the axis of the reel to the point at which the down hanging flat rope is tangential. At the same time the moment of the load-lifting instrumentality is the weight of the cage and its load plus the weight of the unwound rope multiplied by the radius of the drum. As the cage and its load is lifted, the radius of the drum remains substantially the same; but the weight which the drum is supporting grows slowly less as the rope is wound helically upon the drum. The rope 16, as it is wound upon the drum may be laid in successive layers. In the construction shown there will be three layers when the rope is all wound upon the drum. But this makes so little change in the leverage upon the drum that it is not an important factor. At the same time, the weight of the counterweighting instrumentalities is increasing by the weight of the unwound flat rope; but as this rope is unwound, the radial distance from the axis of the reel to the point at which the unwinding flat rope is tangential, is decreasing. These parts may be so proportioned that, because of these changing factors, the cage and its load will be substantially exactly counterweighted at all times. Therefore, a small motor may be employed to turn in either direction the shaft to which the drum and reel are attached; and it will be easy under these conditions to run that motor at a substantially uniform rate.

An engineer can, of course, calculate the necessary weight of the described parts, and may construct the machine in accordance with the existing requirements. If, for example, the drum is 10 feet in diameter, and if there be attached to it 2500 feet of $1\frac{3}{4}''$ wire rope, and if the cage attached to the end of the rope weighs about 13,000 lbs., and carries a load of about 17,000 lbs., the desired result will be attained if the diameter of the reel be 5 feet and if 2500 feet of flat wire rope $\frac{3}{8}'' \times 7''$ is secured to and wound thereon; and if the counterweight attached to this wire rope weighs approximately 36,700 lbs. Of course, these figures are not given with any intention whatever of limiting the invention, but are merely given as an illustration of a practical embodiment of the invention with the parts properly proportioned.

Having described my invention, I claim:—

1. In a hoisting mechanism for deep shaft hoisting, the combination of a drum, a reel, and means adapted to operate at approximately constant speed for rotating them in unison, a rope which is secured to and wound helically and in uniform layers upon the drum in one direction, a load carrier secured to the end of said rope, a flat rope which is secured to and is wound spirally in the opposite direction upon said reel, and a counterweight fixed to the end of said flat rope.

2. In a hoisting mechanism for deep shaft hoisting, the combination of a drum, of constant diameter, a reel, and means adapted to operate at approximately constant speed for rotating them in unison, a rope which is secured to and adapted to be wound in the direction of the axis of said drum to form a layer of rope on said drum, a load carrier secured to the end of said rope, a flat rope which is secured to and is wound spirally in a diametrical direction upon said reel, the said flat rope being arranged to wind in a direction opposite to the rope upon the drum, and a counterweight fixed to the end of said flat rope.

In testimony whereof, I hereunto affix my signature.

ARTHUR G. REESE.